United States Patent [19]
Bobel et al.

[11] Patent Number: 5,138,236
[45] Date of Patent: Aug. 11, 1992

[54] CIRCUIT FOR DRIVING A GAS DISCHARGE LAMP LOAD

[75] Inventors: Andrew Bobel, Des Plaines; Mihail S. Moisin, Lake Forest, both of Ill.

[73] Assignee: Motorola, Inc., Schaumburg, Ill.

[21] Appl. No.: 705,857

[22] Filed: May 28, 1991

[51] Int. Cl.$^5$ .................................... H05B 37/00
[52] U.S. Cl. ............................ 315/209 R; 315/226; 315/307; 315/DIG. 7
[58] Field of Search ........... 315/209 R, 209 T, 219, 315/220, 221, 224, 226, 307, 362, DIG. 7

[56] References Cited

U.S. PATENT DOCUMENTS 4,525,649  6/1985  Knoll et al. .................. 315/226 X
5,047,690  9/1991  Nilssen ........................ 315/226 X Primary Examiner—Robert J. Pascal
Attorney, Agent, or Firm—Peter D. Hudson

[57] ABSTRACT

A circuit (100) for driving fluorescent lamps (102, 104, 106) and including: a half-bridge inverter (112) receiving a unidirectional voltage and producing an alternating voltage, and having control inputs (156, 166); a series-resonant oscillator (126) coupled to the inverter output (116) for producing an alternating signal; and a non-saturating feedback transformer (146) having a primary winding (148) coupled in series between the inverter and the oscillator and secondary winding (150, 152) coupled respectively to the control inputs of the inverter. Since the feedback transformer is non-saturating it provides to the inverter control inputs a linear feedback signal from the inverter. This results in safe, stable, predictable and well-defined circuit operation, in which the possibility of the inverter transistors being destroyed by cross-conduction is substantially removed, and the amount of input voltage "ripple" present in the signal applied to the lamps is reduced.

10 Claims, 2 Drawing Sheets

CIRCUIT FOR DRIVING A GAS DISCHARGE LAMP LOAD

FIELD OF THE INVENTION

This invention relates to circuits for driving loads of gas discharge lamps such as fluorescent lamps.

BACKGROUND OF THE INVENTION

Gas discharge lamps such as fluorescent lamps are most efficiently operated when driven with an AC voltage of high frequency, typically 30 KHz. Such a drive voltage is typically generated by a resonant "tank" circuit made up of an inductive element and a capacitive element. The tank circuit is typically supplied from a utility mains (e.g., having voltage of 120 VAC, 60 Hz) via a rectifier and an inverter. The inverter typically includes series-connected transistors whose control electrodes are transformer-coupled to the tank circuit output so that the inverter transistors are alternately switched ON and OFF, providing to the tank circuit a supply which alternates at the frequency of the tank circuit.

Conventionally, in such a resonant circuit the control electrodes of the inverter transistors are coupled to the tank circuit output by saturating-core transformers. The use of saturating-core transformers ensures automatic cyclical switching from one of the inverter transistors to the other as the respective transformer core saturates. The use of saturating-core transformers enables rapid switching of the inverter transistors, allowing relatively tight control of the inverter output.

However, such saturating core transformers are highly specified components which are typically expensive. Also, the behavior and performance of such saturating core-transformers, in particular the point at which their saturation will cause switching of the inverter, is in practice highly dependent on their precise core characteristics and on their temperature, and is extremely difficult to predictably control. For example, it is common for two such nominally identical saturating-core transformers from different batches made by the same manufacturer by the same process to have significantly different saturation characteristics due to slight differences in the ways that the cores' materials were fired. It has been found that the saturation characteristics of such nominally identical saturating-core transformers may differ by as much as ±20%. The unpredictable saturation characteristics of such typical saturating-core transformers makes difficult the design and stable performance of high quality inverters using such saturating-core transformers and having predictable, well defined operating characteristics.

A further and particularly critical problem arising from the inclusion of such saturating-core transformers is that a saturating-core transformer has its own characteristic frequency at which it will naturally saturate. If this characteristic saturation frequency should become less than the operating frequency of the inverter, cross-conduction of the inverter transistors will occur during switching, destroying the transistors.

SUMMARY OF THE INVENTION

In accordance with the invention there is provided a circuit for driving a gas discharge lamp load, the circuit comprising:

inverter means having an input for receiving a unidirectional voltage and an output for producing an alternating voltage, the inverter means including a first transistor switch means and a second transistor switch means coupled in series to the input, the first transistor switch means having a first control input for controlling the switching of the first transistor switch means, and the second transistor switch means having a second control input for controlling the switching of the second transistor switch means;

resonant oscillator means coupled to the output of the inverter means, and including an inductance and capacitance coupled for producing an alternating signal; and feedback transformer means coupled to the resonant oscillator means and to the first and second control inputs first resistance means coupled serially between the feedback transformer means and the first control input and second resistance means coupled serially between the feedback transformer means and the second control input, the feedback transformer means providing to the first and second control inputs via the first and second resistance means signals which vary linearly with the alternating signal of the resonant oscillator means in operation of the circuit.

In such a circuit, by providing to the first and second transistor switch means control input signals which vary linearly with the substantially sinusoidal alternating signal of the resonant oscillator means, the inverter is caused to operate in a safe, stable, predictable, well-defined manner.

BRIEF DESCRIPTION OF THE DRAWINGS

One circuit in accordance with the present invention for each driving a load of three fluorescent lamps will now be described, by way of example only, with reference to the accompanying drawings, in which.

DESCRIPTION OF THE PREFERRED EMBODIMENT

Figure 1:
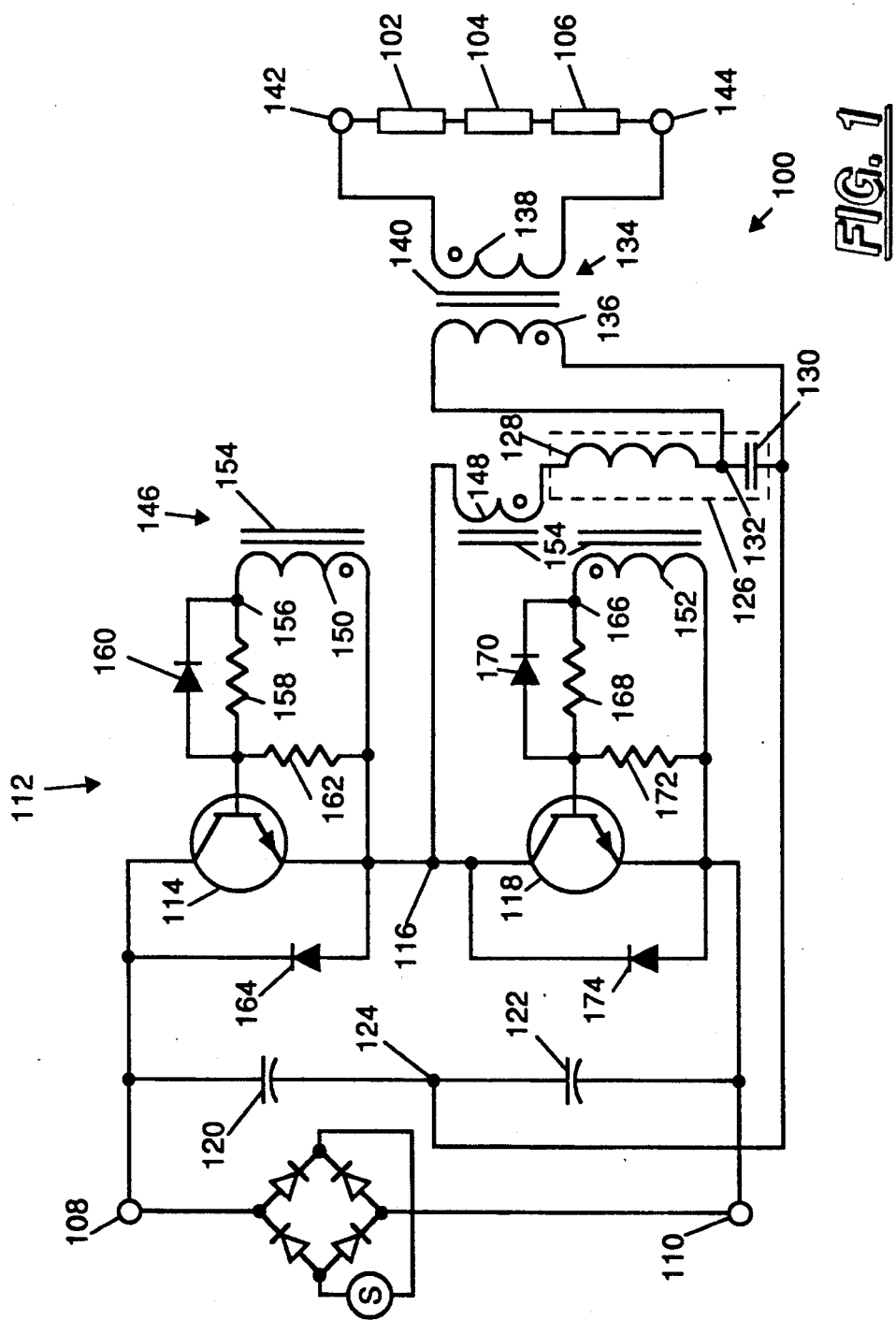
FIG. 1 shows a schematic circuit diagram of the fluorescent lamp drive circuit.

Referring now to FIG. 1, a first circuit 100, for driving three fluorescent lamps 102, 104, 106, has two input terminals 108, 110 for receiving thereacross a DC supply voltage of approximately 390 V, rectified from an AC supply voltage S.

A half-bridge inverter 112 has a bipolar npn transistor 114 (of the type BUL45) connected at its collector electrode to the positive input terminal 108. The transistor 114 has its emitter electrode connected to a node 116. A further npn transistor 118 (like the transistor 114, of the type BUL45) of the inverter 112 has its collector electrode connected to the node 116. The transistor 118 has its emitter electrode connected to the ground input terminal 110. Two capacitors 120, 122 (having equal values of approximately 0.47μF) are connected in series between the input terminals 108, 110 via a node 124.

A series-resonant tank circuit 126 has an inductor 128 (having a value of approximately 2 mH) and a capacitor 130 (having a value of approximately 6.8 nF) connected in series between the node 116 and the node 124 via a node 132.

A load-coupling transformer 134 has a primary winding 136 (having approximately 200 turns) and a secondary winding 138 (having approximately 200 turns) wound on a core 140. The primary winding 136 of the transformer 134 is connected between the node 124 and the node 132 in parallel with the capacitor 130. The secondary winding 138 of the transformer 134 is connected connected between output terminals 142, 144. The fluorescent lamps 102, 104, 106 are connected in series between the output terminals 142, 144.

An inverter-coupling feedback transformer 146 (whose construction will be described in greater detail below) has a primary winding 148 (having approximately 30 turns) and two secondary windings 150, 152 (each having approximately 50 turns) wound on a gapped core 154. The primary winding 148 of the transformer 146 is connected in series with the series-resonant tank circuit 126 between the node 116 and the node 124.

The secondary winding 150 is connected between a node 156 and the emitter electrode of the transistor 114. The transistor 114 has its base electrode connected to the node 156 via a current-limiting resistor 158 (having a value of approximately 10Ω). A diode 160 is connected in parallel with the resistor 158 and has its anode connected to the base electrode of the transistor 114 and has its cathode connected to the node 156. A further resistor 162 (having a value of approximately 180Ω) is connected in parallel with the secondary winding 150 between the base and emitter electrodes of the transistor 114. A further diode 164 is connected between the collector and emitter electrodes of the transistor 114, the diode's cathode being connected to the collector electrode and the diode's anode being connected to the emitter electrode.

The secondary winding 152 is connected (with opposite polarity with respect to the secondary winding 150) between a node 166 and the emitter electrode of the transistor 118. The transistor 118 has its base electrode connected to the node 166 via a current-limiting resistor 168 (having a value of approximately 10Ω). A diode 170 is connected in parallel with the resistor 168 and has its anode connected to the base electrode of the transistor 118 and has its cathode connected to the node 166. A further resistor 172 (having a value of approximately 180Ω) is connected in parallel with the secondary winding 152 between the base and emitter electrodes of the transistor 114. A further diode 174 is connected between the collector and emitter electrodes of the transistor 118, the diode's cathode being connected to the collector electrode and the diode's anode being connected to the emitter electrode.

In use of the driver circuit 100, the series-resonant tank circuit 126 formed by the inductor 128 and the capacitor 130 is powered by the inverter 112 from the node 116 and resonates. The inverter-coupling feedback transformer 146 uses the oscillating current of the series-resonant tank circuit 126 to control the conduction of the transistors 114 and 118 of the inverter 112. When the current in the primary winding 148 of the transformer is in a first direction, the voltage induced in the secondary winding 150 and applied to the base of the transistor 114 causes the transistor 114 to conduct and to supply current in the first direction to the tank circuit. Conversely, when the current in the primary winding 148 of the transformer is in a second direction opposite the first direction, the voltage induced in the secondary winding 150 and applied to the base of the transistor 118 causes the transistor 118 to conduct and to supply current in the second direction to the tank circuit. Thus it will be appreciated that the tank circuit 126 and the inverter 112 are connected in a self-oscillating closed-loop feedback arrangement. The current injected into the conducting transistor's base emitter junction falls to zero before the applied voltage thereacross, causing the transistor to stop conducting after its stored charge has dissipated; the other transistor then conducts, causing the inverter to self-oscillate.

Figure 2:
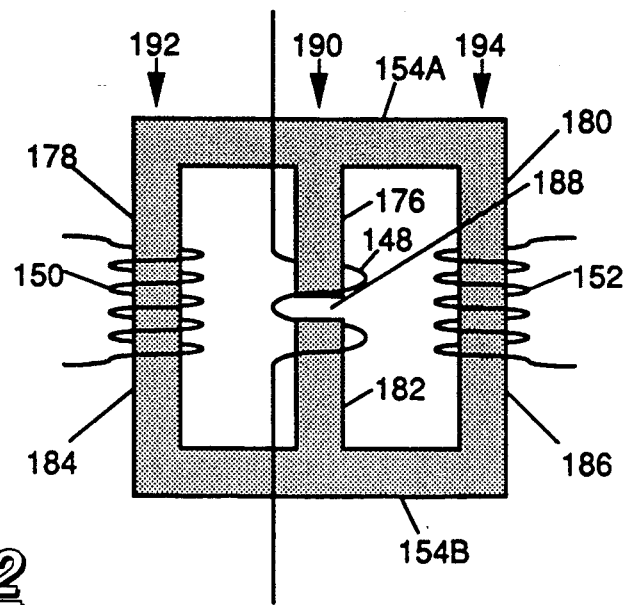
FIG. 2 shows a cross-sectional diagram of a transformer used in the circuit of FIG. 1.

Referring now also to FIG. 2, the inverter-coupling feedback transformer 146 is constructed of a EE 187 core formed by two identical "E"-shaped core portions 154A and 154B made of "3C6A" ferrite material (available from Hitachi). The "E"-shaped core portion 154A has an inner leg 176 and two outer legs 178, 180 of equal length greater than that of the inner leg 176. The "E"-shaped core portion 154B has an inner leg 182 and two outer legs 184, 186 of equal length greater than that of the inner leg 182. The two core portions 154A and 154B are brought together with their outer legs 178, 180 and 184, 186 respectively abutting. With the outer legs abutting, the shorter inner legs 176 and 182 face each other non-contiguously to form a gap 188 in an inner limb 190 of the transformer 146. In the preferred embodiment the gap length is chosen to be approximately 0.015". The primary winding 148 is wound on the gapped inner limb 190 of the transformer 146, and the secondary windings 150 and 152 are wound respectively on contiguous outer limbs 192 and 194.

It can be shown that the length of the gap 188 in the center limb 190 of the transformer 146 affects the conduction angle of the transistors 114 and 118 of the inverter loaded with the series-resonant tank circuit 126. The relationship between the transistors' conduction angle and the gap 188 is an approximately linear relationship (for example, a gap length of approximately 0.015" produces a conduction angle of approximately 10°, while a gap length of approximately 0.050" produces a conduction angle of approximately 60°). It will be understood that the larger the conduction angle, the higher will be the frequency of oscillation of the inverter 122 and the tank circuit 126. In this way the length of the gap 188 affects the oscillation frequency of the inverter 122 and the tank circuit 126.

It will be understood that the presence of the gap 188 in the core 154 of the transformer 146, in addition to controlling the oscillation frequency of the inverter 122 and the tank circuit 126, lowers the inductances of the transformer windings 148, 150 and 152. This lowering of inductance produced by the presence of the gap 188 allows the transformer windings to have desired low levels of inductance (typically the primary winding 148 has an inductance of approximately of 36 μH and the secondary windings 150 and 152 have inductances of approximately 100 μH) while allowing the windings to have a sufficient number of turns to prevent the core 154 from saturating. Thus, the circuit of FIG. 1 is able to operate in a stable and predictable manner since the inverter-coupling feedback transformer does not saturate but instead operates linearly.

It will be understood that the presence of a gap in the inverter coupling feedback transformer is not absolutely necessary in order for the core to be non-saturating (alternatively, for example, the core could be made of sufficiently low permeability material or could be made with a sufficiently large cross-section that the core would not saturate), but as explained above the use of a gapped core lowers the inductance of the windings while allowing the windings to have a sufficient number of turns to prevent the core from saturating. Whether or not a gap is used, the conduction angle of the transistors 14 and 118 is determined by the inductance $L_2$ of the secondary windings and the base resistance $R_B$ of the inverter transistors, as will be explained below; if a gap is present, the length of the gap affects the winding inductance.

It will be understood that the diodes 160 and 170 in the base drives of the transistor 114 and 118 respectively provide current paths for rapid discharge of the transistors' base voltages when each transistor turns off. It will be understood that the resistors 162 and 172 connected across the transistors' base-emitter junctions respectively prevent damage to the transistors which would arise if the bases became open-circuited during switching. It will be understood that the diodes 164 and 174 provide reverse-voltage protection between the collector and emitter of the transistor 114 and between the collector and emitter of the transistor 118 respectively.

It can be shown that for a non-saturating inverter-oscillator circuit of the type shown in FIG. 1, the primary winding current ($I_1$) and the secondary winding current ($I_2$) of the inverter coupling feedback transformer are related as follows:

$$I_2 = \left[ \frac{\omega \cdot k \cdot \sqrt{L_1 \cdot L_2}}{\sqrt{R_B + \omega^2 \cdot L_2^2}} \cdot e^{j(\pi/2 - \phi)} \right] \cdot I_1 \quad \text{(i)}$$

where $\omega$ is the angular operating frequency of the inverter, k is the coupling constant between the primary and secondary windings of the feedback transformer, $L_1$ is the inductance of the feedback transformer primary winding, $L_2$ is the inductance of the feedback transformer secondary winding, $R_B$ is the resistance of the series resistor between the secondary winding and the transistor base, and $\phi$ (the conduction angle) is given by:

$$\phi = \arctan\left(\frac{\omega \cdot L_2}{R_B}\right) \quad \text{(ii)}$$

As mentioned above, a critical feature of the circuit of FIG. 1 is that the inverter-coupling feedback transformer 112 operates linearly, without saturating. In order to achieve this, the transformer 112 is designed in the following way.

Firstly, a value is chosen for the conduction angle of the inverter transistors 114 and 118. Depending on the particular transistors used and their anticipated operating temperature, the conduction angle is chosen at a value small enough to provide low switching losses in the transistors and large enough to produce stable operation of the inverter at an elevated operating temperature. Typically, the chosen conduction angle is in the range 10°-30°.

For a chosen conduction angle $\phi$, and for a chosen value $R_B$ of the series resistance 158 and 168 in the base drive of each of the transistors 114 and 118 (in the present example 10Ω), the required value of inductance $L_2$ for each of the secondary windings 150 and 152 is determined from equation (i) above.

For a chosen core type, the minimum number of turns less for the feedback transformer windings to produce than the saturating flux density $B_{SAT}$ (typically in the region of 1500 Gauss) is calculated from the following equation:

$$B_{SAT} = \frac{L \cdot I_{MAX} \cdot 10^4}{N \cdot A} \quad \text{(iii)}$$

where L is the winding inductance, $I_{MAX}$ is the maximum current in the winding, N is the number of turns, and A is the cross-sectional area of the core 154.

In the preferred embodiment, as mentioned above, the core 154 is made of "3C6A" ferrite material, has a cross-sectional area of approximately $2 \times 10^{-5}$ square meters (0.2 square centimeters), has a primary winding of approximately 30 turns and an inductance of approximately 36μH, has secondary windings each of approximately 50 turns and inductances of approximately 100μH, has a gap length of approximately 0.015", and operates at a frequency of approximately 30 KHz.

The inverter-coupling feedback transformer 146 thus operates linearly, supplying across the base-emitter junctions of the inverter transistors 114 and 118 control signals which vary linearly with the output of the oscillator tank circuit 126. It will be appreciated that the base-emitter junctions of the inverter transistors 114 and 118 are themselves non-linear and present a negative impedance characteristic load to the secondary windings 150 and 152 respectively. The result of applying a linearly transformed feedback signal (which like the tank circuit output signal is substantially sinusoidal) to control the base-emitter junctions of the inverter transistors 114 and 118 (which act as loads for the secondary windings 150 and 152) in this way is to produce stable operation of the inverter 112 and the tank circuit 126, resulting in improved control of the current applied to the lamps 102, 104 and 106.

It has been found that in such a linear feedback arrangement the exact frequency of oscillation of the closed-loop inverter/tank circuit depends on the exact impedance of the lamp load 102, 104 and 106, the oscillation frequency decreasing as the load impedance falls, and the oscillation frequency increasing as the load impedance rises. It will be appreciated that since the power transferred to the lamp load is dependent on the frequency of oscillation of the closed-loop inverter/tank circuit, the peak power transferred to the lamp load is thus reduced when the input voltage to the circuit is at a peak, and the minimum power transferred to the lamps is thus increased when the input voltage to the circuit is at a low. It will be understood that the effect of this is to reduce the amount of supply voltage "ripple" which is present in the signal applied to the lamp load. This reduction in ripple results in reduced flicker being generated by the lamps.

Thus it will be appreciated that by providing linear feedback to the inverter transistors in this way, the operation of the circuit remains stable in spite of load variations, and is independent of variations in characteristics of the feedback transformer. It will also be appreciated that since the feedback transformer 146 is not saturating it does not introduce its own characteristic saturation frequency into circuit operation, substantially removing the possibility of inadvertant cross-conduction and destruction of the transistors to which saturating core transformer circuits are subject.

Figure 3:
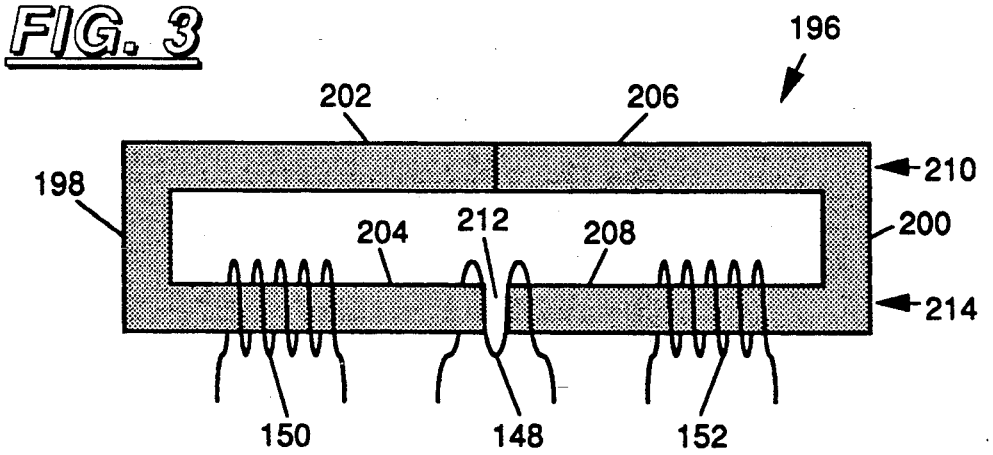
FIG. 3 shows an alternative construction to that shown in FIG. 2.

Referring now also to FIG. 3, in an alternative construction to that shown in FIG. 2, an inverter-coupling feedback transformer 196 is constructed on an EE 187 core formed by two identical "U"-shaped core portions 198 and 200 made of the same "3C6A" ferrite material as the core 146 of FIG. 2. The "U"-shaped core portion 198 has two unequal length, parallel legs: a shorter leg 202 and a longer leg 204. The "U"-shaped core portion 200 has two unequal length, parallel legs: a shorter leg 206 and a longer leg 208. The two core portions 198 and 200 are brought together with their longer legs 204 and 208 abutting to form a contiguous upper limb 210 of the transformer 196. With the longer legs abutting, the shorter legs 202 and 206 face each other non-contiguously to form a gap 212 in a lower limb 214 of the transformer 196. As in the construction of FIG. 2, the gap length is chosen to be approximately 0.015". The primary winding 148 is wound on the center of the gapped lower limb 214, the winding straddling the gap 212. The secondary windings 150 and 152 are wound on the gapped lower limb 214 of the transformer 196, each secondary being positioned respectively on an opposite side of the primary winding 148. It will be understood that the transformer 196 whose construction is shown in FIG. 3 functions in exactly the same manner as the already described transformer 146 shown in FIG. 2.

It will be appreciated that although in the preferred embodiment there has been described above a circuit for driving fluorescent lamps, the invention may be applied generally to the driving of other types of gas discharge lamps.

It will also be appreciated that various modifications or alternatives to the above described embodiment will be apparent to the person skilled in the art without departing from the inventive concept of providing a circuit for driving a gas discharge lamp load in which a linear feedback signal from an oscillator is used to control the transistors of an inverter so as to ensure safe, stable, predictable and well-defined circuit operation.

We claim:

1. A circuit for driving a gas discharge lamp load, the circuit comprising:
   inverter means having an input for receiving a unidirectional voltage and an output for producing an alternating voltage, the inverter means including a first transistor switch means and a second transistor switch means coupled in series to the input, the first transistor switch mean shaving a first control input for controlling the switching of the first transistor switch means, and the second transistor switch means having a second control input for controlling the switching of the second transistor switch means;
   resonant oscillator means coupled to the output of the inverter means, and including an inductance and a capacitance coupled for producing an alternating signal;
   feedback transformer means coupled to the resonant oscillator means and to the first and second control inputs;
   first resistance means coupled serially between the feedback transformer means and the first control input and second resistance means coupled serially between the feedback transformer means and the second control input, the feedback transformer means providing to the first and second control inputs via the first and second resistance means signals which vary linearly with the alternating signal of the resonant oscillator means in operation of the circuit.

2. A circuit according to claim 1 wherein the inverter means comprises a half-bridge inverter.

3. A circuit according to claim 1 wherein the resonant oscillator means comprises a series-resonant tank circuit.

4. A circuit according to claim 1 wherein the first and second transistor switch means comprise bipolar npn transistors.

5. A circuit according to claim 1 further comprising first diode means coupled in parallel with the first resistance means and second diode means coupled in parallel with the second resistance means.

6. A circuit according to claim 1 wherein transformer means comprises a primary winding connected in series between the inverter means and the resonant oscillator means, a first secondary winding coupled to the first control input and second secondary winding coupled to the second control input.

7. A circuit according to claim 1 wherein the feedback transformer means comprises a gapped transformer.

8. A circuit according to claim 1 wherein the feedback transformer comprises an "E"-shaped core.

9. A circuit according to claim 1 wherein the feedback transformer comprises a "U"-shaped core.

10. A circuit for driving a gas discharge lamp load, the circuit comprising:
    half-bridge inverter means having an input for receiving a unidirectional voltage and an output for producing an alternating voltage, the inverter means including a first transistor switch means and a second transistor switch means coupled in series to the input, the first transistor switch means having a first control input for controlling the switching of the first transistor switch means, and the second transistor switch means having a second control input for controlling the switching of the second transistor switch means; and
    series-resonant oscillator means coupled to the output of the inverter means, and including an inductance and a capacitance coupled for producing an alternating signal; and
    feedback transformer means having a primary winding connected between the inverter means and the resonant oscillator means, a first secondary winding coupled to the first control input and second secondary winding coupled to the second control input, the feedback transformer means providing to the first and second control inputs signals which vary linearly with the alternating signal of the resonant oscillator means in operation of the circuit.

* * * * *

REEXAMINATION CERTIFICATE (3062nd)

United States Patent [19]

Bobel et al.

[11] B1 5,138,236

[45] Certificate Issued Nov. 26, 1996

[54] CIRCUIT FOR DRIVING A GAS DISCHARGE LAMP LOAD

[75] Inventors: Andrew Bobel, Des Plaines; Mihail S. Moisin, Lake Forest, both of Ill.

[73] Assignee: Motorola Lighting, Inc., Buffalo Grove, Ill.

Reexamination Request:
No. 90/003,275, Dec. 15, 1993

Reexamination Certificate for:
Patent No.: 5,138,236
Issued: Aug. 11, 1992
Appl. No.: 705,857
Filed: May 28, 1991

[51] Int. Cl.$^6$ .................................................. H05B 37/00
[52] U.S. Cl. ............... 315/209 R; 315/226; 315/307; 315/DIG. 7
[58] Field of Search ................ 315/209 R, 226, 315/307, DIG. 7, 219, 276, 209 T, 220, 221, 224, 226, 362, DIG. 2, DIG. 5

[56] References Cited

U.S. PATENT DOCUMENTS

| | | | |
|---|---|---|---|
| 4,187,450 | 2/1980 | Chen | 315/278 |
| 4,350,930 | 9/1982 | Peil et al. | 315/49 |
| 4,874,990 | 10/1989 | Dobnick | 315/276 |
| 5,045,760 | 9/1991 | Teresinski | 315/209 R |

FOREIGN PATENT DOCUMENTS

| | | |
|---|---|---|
| 166786 | 7/1987 | Japan . |
| 2223367 | 4/1990 | United Kingdom . |

OTHER PUBLICATIONS

Motorola, published Application Note No. AN1049, "The Electronic Control of Fluorescent Lamps" Copyright 1990, Printed May, 1990.
Wood "High Frequency Resonant Inverter Drives Fluorescent Lamps", Power Conversion and Intelligent Motion, vol. 16, No. 4, pp. 43–44, Apr. 1990.
Fink et al. Electronic Engineers' Handbook 1989 pp. vii, 15–17, 15–60 to 15–63.
Futagawe "RCC system" Electronics Technology vol. 31, No. 3 pp. 39–49 Mar. 1989.
Sedra et al. "Microelectronic Circuits" 1982 pp. 390–392.
Hayt, Jr. et al. "Engineering Circuit Analysis" 1978 pp. 489, 490 and 498.

*Primary Examiner*—Robert Pascal

[57] ABSTRACT

A circuit (100) for driving fluorescent lamps (102, 104, 106) and including: a half-bridge inverter (112) receiving a unidirectional voltage and producing an alternating voltage, and having control inputs (156, 166); a series-resonant oscillator (126) coupled to the inverter output (116) for producing an alternating signal; and a non-saturating feedback transformer (146) having a primary winding (148) coupled in series between the inverter and the oscillator and secondary winding (150, 152) coupled respectively to the control inputs of the inverter. Since the feedback transformer is non-saturating it provides to the inverter control inputs a linear feedback signal from the inverter. This results in safe, stable, predictable and well-defined circuit operation, in which the possibility of the inverter transistors being destroyed by cross-conduction is substantially removed, and the amount of input voltage "ripple" present in the signal applied to the lamps is reduced.

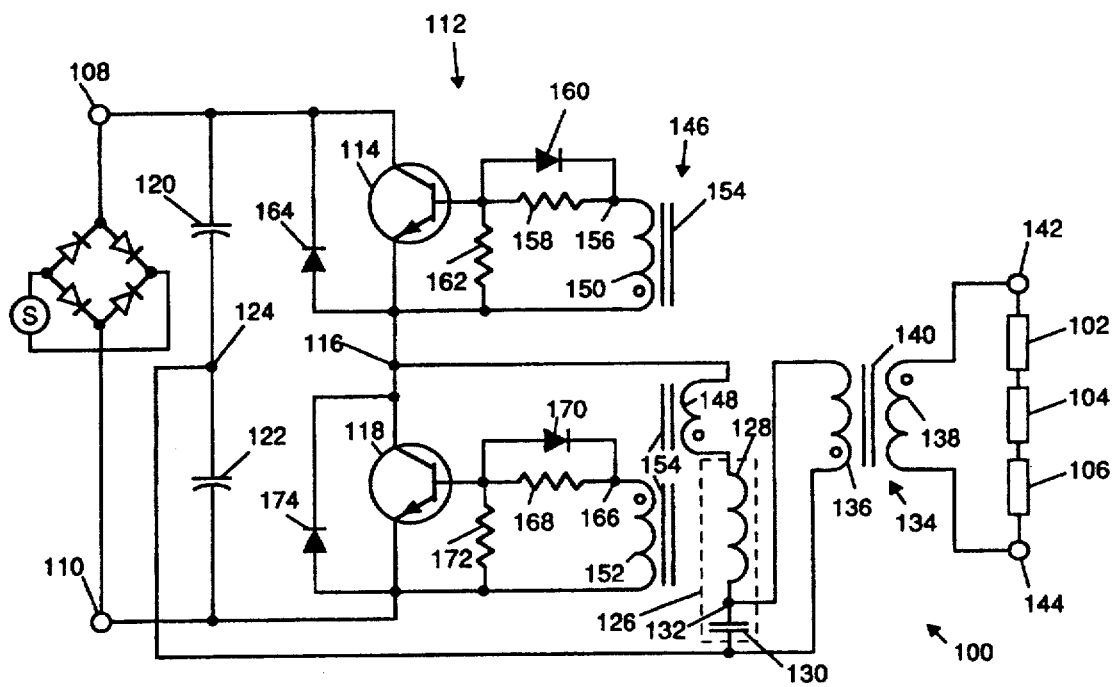

B1 5,138,236

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *